June 30, 1931.   J. A. PROCTOR ET. AL   1,812,713
ELECTRICAL CONDENSER
Filed Jan. 23, 1925   2 Sheets-Sheet 2
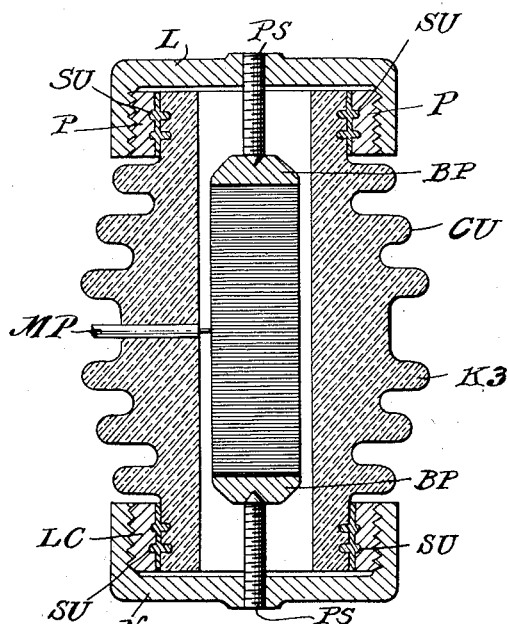
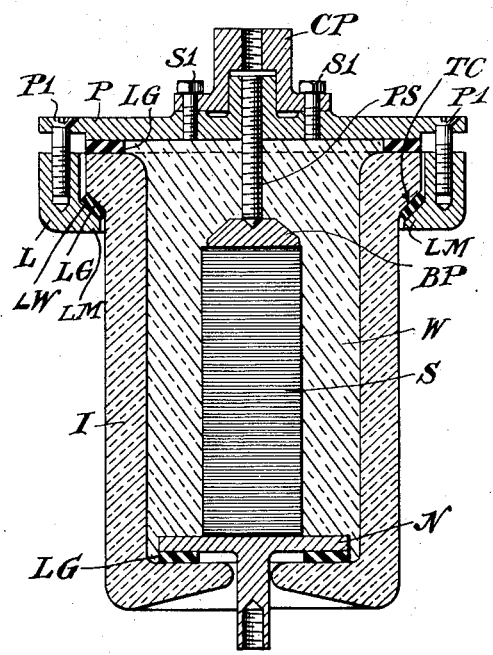
INVENTORS:
John A. Proctor
William M. Bailey
BY
ATTORNEY Patented June 30, 1931

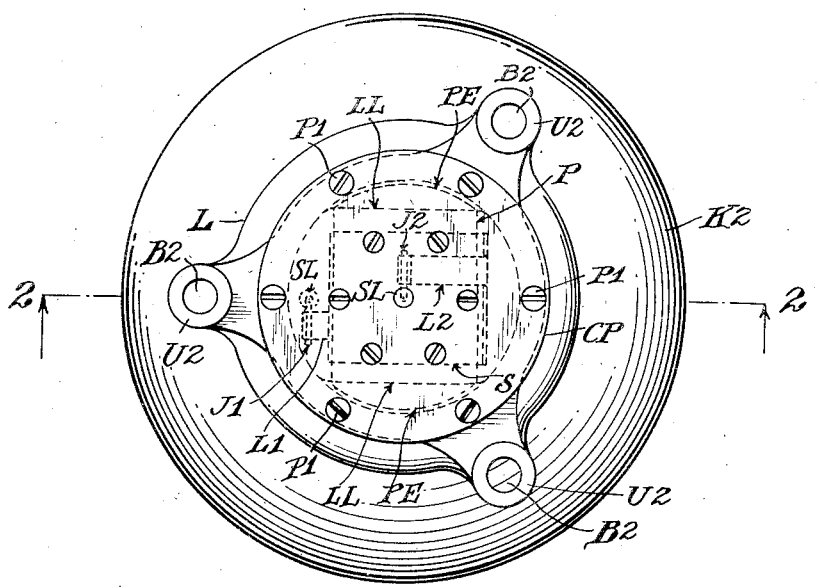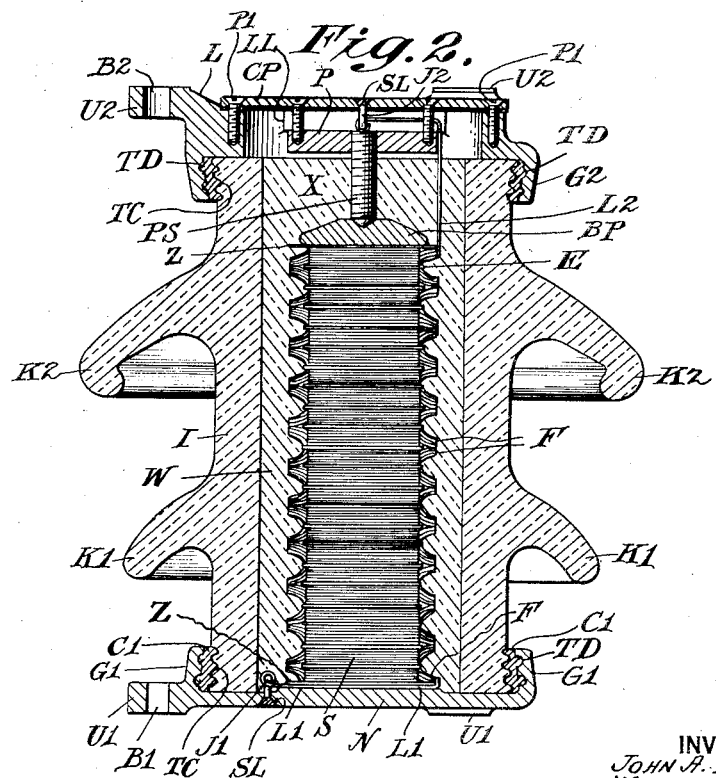

1,812,713

UNITED STATES PATENT OFFICE

JOHN A. PROCTOR, OF LEXINGTON, AND WILLIAM M. BAILEY, OF LYNN, MASSACHUSETTS, ASSIGNORS TO WIRELESS SPECIALTY APPARATUS COMPANY, OF BOSTON, MASSACHUSETTS, A CORPORATION OF NEW YORK

ELECTRICAL CONDENSER

Application filed January 23, 1925. Serial No. 4,150.

This invention relates to improvements in electrical condensers, particularly in high potential condensers, and more particularly of the sheet-stack type, especially wherein the stack for high potential service comprises a plurality of sections insulated from one another by insulating sheets between the sections in the stack and connected in series with one another as by connections outside the stack.

Among the various objects of the invention is that of providing a structure which is an improvement on the special type wherein the stack is contained in a substantially or more or less tubular casing which consists of insulating material preferably such as porcelain and which is provided with metal ends which serve to clamp the stack under high compression inside the casing, to complete the enclosure of the stack and to serve as electrical terminals at high potential difference which lie at opposite ends of the structure separated from one another by the insulating walls of such casing.

The invention consists of the various features of construction substantially as described hereinafter and as shown in the drawings, of which Figure 1 is a plan of a complete condenser unit;

Fig. 2 is a central vertical section of the same along line 2—2 of Fig. 1;

Figs. 3 and 4 are central vertical sections of various modified forms of the condenser unit of the invention, Figs. 1–2 illustrating a preferred form.

In Fig. 2 the series-connected sections (shown diagrammatically) of stack S are insulated from one another by wide mica sheets E, each section consisting of alternating mica sheets and foil sheets. This permits a high potential difference across the end sections of the stack when, as shown, the foils F projecting from opposite ends of each section are soldered or fused to the like potential foils of adjacent sections.

In this invention, the casing for stack S consists of a tube I of porcelain, such material being that heretofore extensively employed in high potential insulators, but here serving as the casing for stack S. The open ends of this porcelain casing are closed by metal end structures.

The bottom end member N preferably is of malleable iron, and is one of the compression members of the clamping system for stack S, which rests on it. The outside wall of the lower end of casing I is (at TC) slightly tapered outwardly and downwardly and is corrugated, or substantially roughened or grooved, as shown. End N has a flange G1, the inner wall of which is correspondingly or cooperatively tapered, i. e., inwardly and upwardly, that is, opposite to the casing-taper. It also is roughened or corrugated or grooved at TD. In assembling, an end (right) of a copper strip L1 is fused to the projecting foils F of the lowest stack section. The free end of strip L1 is wrapped around and fused (as soldered) to a flexible wire cable J1. End N is formed with a countersunk recess SL. Stack S is placed upon end N with wire J1 projecting into recess SL. Later, wire J1 is secured in place by solder which fills recess SL. Before stack S is placed centrally on end N, the cement C1 is placed in the annular space between the tapered walls of end-flange G1 and casing I. The tapered and corrugated portion TC of the porcelain casing is unglazed so as to take the cement most effectively. With this construction, the only way thereafter to separate casing I and end N is to crush or dig out the cement C1. End N closes and seals the lower end of casing I. For C1, we recommend neat Portland cement. End N has three integral lugs or feet U1 (Fig. 1), each extending laterally and with a bolt hole formed in it.

On top of stack S is placed a metal bearing plate BP. The upper stack terminal is a copper strip L2 extending upwardly, its lower end being fused to the projecting foils of the uppermost stack section. Stack S may be embedded in paraffin wax or submerged in oil; but owing to the insulation provided by porcelain casing I between the metal ends of the stack, the only function required of the wax or oil, if used, is to prevent flashover from stack section to stack section. Stack S may lie as close as desired to the interior wall of casing I, so that a compact over-all structure is permitted. The exterior wall of casing I is glazed, save at the tapered cemented portions TC. The inside wall of casing I is unglazed to permit intimate contact by wax or oil W to seal along the inside wall against moisture and prevent leakage path between end terminals.

The metal top construction is as follows. A malleable iron collar L is applied to casing I as by the means shown and described above for end member N. Collar L has three integral lugs or feet U2 (Fig. 1) with bolt holes B2, as in the case of bottom end N, and laterally and upwardly extending. The bolt holes B1 in members N and L should be in alinement. The ends of casing I and of the metal end members 1, N should be parallel to one another. Casing I preferably is provided with the corrugations, skirts or petticoats K1, K2, which increases the leakage distance of high potential flashover from one metal end to another over the glazed porcelain exterior of casing I. The glaze seals the porcelain pores and assists in shedding water and dirt. The skirts, in addition to increasing the flashover distance, also assist in shedding water and dirt and provide surfaces beneath them which are protected from access of moisture and dirt; and they serve to increase the mechanical strength of the porcelain casing, in this sense constituting a thick casing wall with or without substantial thickness of the rest of the casing wall. This condenser unit is a weatherproof and waterproof high potential condenser which is designed for outdoor service with adjacent high tension lines as is to be described in connection with Figs. 3 and 4. It is an important feature of the corrugations in the form of skirts K1 and K2 that, as distinguished from the location of ordinary condenser casings under an insulating canopy, the spaces beneath and inside the skirts of condenser casing I do not permit of birdsnesting. Upper and wider skirts K2 serves also as rain-shield for the lower skirt K1 and lower portions of the casing; and lower skirt K1 serves as rain-shield for the lowest portions of the casing.

Between the top of stack S and the upper end of casing I is a space X which provides tolerance for stacks of varying length and substantially the same capacitance; pressure screws PS being sufficiently long for this purpose.

Collar L has the central hole shown, which is a little larger than that through casing I, so that in the process of assembly to be described, the steel pressure plate P can have its ends resting on top of the wall of casing I at the radially-inward portion thereof (left top, Fig. 1).

Before the application of the sealing or cover-plate CP, the pressure-plate P is applied. This plate P (with screw PS and bearing plate BP) clamps stack S under high compression of the order of a thousand pounds more or less per square inch of active area of the stack. Plate P is of steel and is oblong with rounded ends PE (Fig. 1), which ends respectively engage under two shoulders LL in diametrically opposite sides of the hole through collar L. These shoulders LL of collar L project radially and inwardly from the inner wall of the central hole in collar L. With collar L cemented in place, plate P is set down on top of the wall of casing I and then is given a quarter-turn to swing it under the two opposite collar-shoulders LL. Then adjustable pressure screw PS is screwed down through the central hole in plate P and down against bearing plate BP. Further adjustment of screw PS pushes pressure plate P upwardly against the two opposite shoulders LL of collar L, the resulting strain coming on the joints between casing I and collar L and lower end N. Since collar L and lower end N are rigid with casing I, the latter thereby becomes the tension member of the stack-clamping system. Preferably the oil or wax W is not poured in until after the sheets of the stack thus are compressed or held compressed together in intimate contact with one another. The wax can enter freely thru the spaces between inner wall of casing I and the sides of oblong pressure-plate P.

The condenser unit is now complete save for the sealing or cover-plate CP of steel for water and weather protection of the interior of the condenser. This plate CP in Fig. 2 performs no compressing function. It is secured in place by an annular series of screws P1, which enter collar L near its inner wall. This plate CP is countersunk at SL (Fig. 1) to receive solder for flexible lead J2 around which is rolled and fused the upper end of copper strip L2. Thus cover plate CP and bottom end N are the opposite potential terminals of the condenser at high potential difference. Upper lead L2 (Fig. 2) extends up from stack S through the central hole in collar L and between the sides of oblong pressure plate P and the non-shouldered walls of the central hole in collar L. The upper and lower leads L2 and L1 to solder SL may consist of flexible cables soldered to stiff metal end stack-sheets 2.

Casing I, while preferably of porcelain, may be in some cases of other insulating material such as preferably pyrex glass, and the like, having at least a surface which is vitreous or glazed. Porcelain, however, is preferred for the weatherproof form, and porcelain is better for this type of condenser generally on account of its strength which is availed of in special ways by this invention, the structural weakness of the porcelain in other respects being sufficiently discounted by adequate thickness of the casing walls as shown in proportion. The porcelain constitutes an effective structure for the metal end members when cemented thereto. In practice, this condenser unit has dimensions which over-all and in detail are larger by several times than the dimensions of Figs. 1 and 2. The outer surface of porcelain casing I may be corrugated in other ways than the skirting K1, K2, as is indicated generally in Fig. 3.

This structure of Figs. 1–2 provides a strong clamping-casing of insulating material, notwithstanding that insulating material itself is structurally weak in relation to such relatively enormous strains of a thousand pounds per square inch involved herein. In this structure there are no metal parts save the stack-armatures (foils) which lie between the two opposite potential ends and terminals. Also there is ample leakage or flashover path over an ideal insulator between the metal casing parts of high potential difference. By virtue of the special construction disclosed herein, the strength of the porcelain is utilized and its inherent structural weakness is minimized. The metal ends perform four functions, (1) compress the stack; (2) serve as condenser terminals; (3) serve as localizers of electrostatic fields at the opposite potential ends of the stack; and (4) serve as means by which successive condenser units are or may be mounted together end to end, the ends L and N being permissively adapted in structure for that purpose as shown as in any desired convenient form. On account of the insulation provided by porcelain casing I, the problem is entirely eliminated which has been involved in series sectional high potential condensers in connection with the insulation of a high potential terminal from a metal stack-casing out through which such terminal extends from the stack.

The condenser unit herein described is designed for low current service (at high potential) and therefore there is provided no special means for heat dissipation other than the metal end structures and the insulating filler as wax or oil when used. In other and higher current uses of the invention, however, such special heat-dissipating means may be incorporated as desired by the designer.

In Fig. 3, stack S is embedded in wax W inside a tubular porcelain casing I formed with corrugations K3 to increase the flashover characteristic between the condenser terminals. A high potential lead MP is brought out through a hole in casing I from a midpoint of the stack S, so that the ends of the stack are at low and the same potential. Top and bottom metal collars P and LC, and also insulating casing I, are formed with registering holes filled with cement SU anchoring the collars to the casing. Metal end caps L and N close the ends of casing I, have threaded engagement with collars P as shown, and LC respectively, and receive pressure screws PS operating on bearing plates BP at the two ends of the stack. Thus end caps L and N constitute both the sealing means for the stack and also the means for transmitting the compression strains to casing I as the tension member of the stack-clamping system via collars P and LC. Here the exterior glazed surface of casing I, corrugated at CU, serves to insulate, with a high flashover, the high potential terminal MP from the metal end structures L and N.

In Fig. 4, the bottom construction has the end plate N inside the casing and the upper construction is modified in a manner similar to that of Fig. 2, although as in the other figures pressure screw PS presses down on bearing plate BP on top of stack S. The upper end of screw PS extends through steel pressure plate P. Plate P also serves to seal the interior of the porcelain casing I at the upper end, as does cover plate CP of Fig. 2. Lead gasket LG on top of the wall of casing I lies between the latter and the bottom of plate P. The upper portion of the wall of casing I is thicker than the rest of the wall in order to increase strength at the points where clamping strains come on the porcelain casing as the tension member of the stack-clamping system. Also this upper wall portion is tapered at TC as in Fig. 2. Metal collar L has a lower annular rim LM, the interior wall LW of which is tapered to co-operate with taper TC of casing I. Said two tapered portions are brought toward one another against intervening lead gasket LG. Collar L is held in place by screws P1 through plate P. With the lead gasket between the tapered surfaces in place, then when the screw PS is screwed down on bearing plate BP, plate P tends to move upward pulling up collar L to clamp the latter against casing I at the tapered portions. The gasket between plate P and casing I may be put in place after stack S has been put under the desired compression, in which case plate P may lie, prior to screwing down of screw PS, directly on top of the wall of casing I. Finally, metal terminal member CP may be secured by S1 to plate P, to cover the end of screw PS and provide a threaded opening for a circuit terminal.

The wide possibilities as to the various forms in which the invention may be embodied are suggested by the modifications of Figs. 3 and 4.

In Fig. 2 the cement C1 is partly under tension and partly under compression of the stack-clamping system, as is also the intermediate gasket of Fig. 4. The bottom gasket of Fig. 4, is under compression strains of the stack-clamping system. In Fig. 2 a lead gasket (poured molten) or the like may replace cement C1 as a filler of the space between the adjacent porcelain and metal members; and in the other figures cement may replace the lead gaskets in the line of clamping compression. In any case, the cement or gasket protects the porcelain casing against the metal member under strain and in engagement with it. The condenser-sealing function of plate CP of Fig. 2 is executed in Fig. 3 by end caps L and N; in Fig. 4 by plate P. The function of pressure plate P of Fig. 2, of transmitting clamping strains to casing I, is executed in Fig. 3 by end caps L and N; in Fig. 4 by plate P. The function of collar L of Fig. 2 in securing to casing I is executed in Fig. 3 by collars P and LC; in Fig. 4 by collar L. The function of collar L of Fig. 2 in anchoring a coverplate as CP is executed in Fig. 3 by collars L; in Fig. 4 by collar L.

In the claims the specification of the casing as porcelain is intended to appropriate all patentable novelty as to such specific material itself in addition to other materials of functional equivalency in the several combinations of the various claims.

We particularly point out and distinctly claim the part, improvement or combination which we claim as our invention or discovery, as follows:—

1. As a metal end-construction for a high potential sheet-stack electrical condenser enclosed in an insulating casing, a collar secured to said casing and formed with a central hole and with two inwardly projecting shoulders on diametrically opposite sides of the wall of said hole; and a plate located between the end of the stack and the said shoulders and transmitting clamping pressure from the stack to said collar and insulating casing.

2. As a metal end-construction for a high potential sheet-stack electrical condenser enclosed in an insulating casing, a collar secured to the end of the casing and formed with a central hole; a pressure plate, and a pressure-adjusting screw acting on the end of the stack through said pressure plate; said pressure plate lying between the stack and said collar and bearing against the collar.

3. As a metal end-construction for a high potential sheet-stack electrical condenser enclosed in an insulating casing, a collar secured to the end of the casing and formed with a central hole; a cover plate secured to said collar over said hole; and an adjusting screw acting on the end of the stack through said pressure plate; said pressure plate lying inside said cover plate and between the stack and said collar and bearing against the collar.

4. As a metal end-construction for a high potential sheet-stack electrical condenser enclosed in a porcelain casing, the combination of a collar, a pressure plate and a cover plate; the collar having a depending flange having its inner surface tapered inwardly toward the intermediate length of the casing, for securing to the casing; the pressure plate lying between the stack and the collar and bearing against the latter end stack-clamping pressure; the cover plate being secured to the collar beyond the pressure plate; and the collar being formed with laterally extending bolting-feet for electrical and mechanical connection with a similar member of a similar condenser unit.

5. As a metal end-construction for a high potential sheet-stack electrical condenser, to be enclosed in an insulating casing, the combination with a collar of a pressure-plate and a cover plate; the pressure plate lying between the stack and collar and bearing against the latter end stack-clamping pressure, the cover plate being secured to the collar over the pressure plate; and the collar being formed with a flange for securing to the casing and with bolting-feet located beyond the cover plate for electrical and mechanical connection to a similar member of a similar condenser unit.

6. As a metal end-construction for a high potential sheet-stack electrical condenser enclosed in a tubular casing of structural insulating material, a metal member secured to an end of the casing and formed with bolting-feet for electrical and mechanical connection with similar parts of similar condenser units, said insulating casing being under an initial tension due to the compression of said stack.

7. As a metal end-construction for a high potential sheet-stack electrical condenser enclosed in a tubular casing of structural insulating material a metal member formed with a flange parallel to the wall of the casing for securing to an end of the casing and with outwardly and upwardly projecting bolting feet for electrical and mechanical connection with similar parts of similar condenser units, said insulating casing being under an initial tension due to the compression of said stack.

8. In a high potential condenser, the combination with a condenser stack to be enclosed and compressed, of a thick-walled porcelain stack-casing having an exterior portion tapered inwardly toward an intermediate portion of its length; a metal collar around said casing-end and having a cooperatively tapered portion; a metal stack-compressing member located inside said casing and exerting clamping compression against one end of the stack; and a metal member located between said collar and stack-compressing member and mechanically connected to both, thereby transmitting stack-clamping strains to the porcelain casing as a tension member.

9. In a high potential condenser, the combination with a condenser stack to be enclosed and compressed, of a thick-walled porcelain stack-casing having an exterior portion tapered inwardly toward an intermediate portion of its length; a metal stack-compressing member exerting clamping compression against an end of the stack; a metal strain-transmitting member having a portion tapered cooperatively with the tapered portions of said casing and spaced therefrom; and a filling material in said space between the porcelain and metal surfaces.

10. In a high potential condenser, the combination with a condenser stack to be enclosed and compressed, of a porcelain stack-casing having an exterior portion tapered inwardly toward an intermediate portion of its length; a metal stack-compressing member exerting clamping compression against an end of the stack and located inside said casing; and a metal collar surrounding the outside of the tapered end of the casing, and having a cooperating tapered surface; said collar and stack-compressing member being mechanically connected to transmit clamping strains to the casing as a tension member.

11. In a high potential condenser, the combination with a condenser stack to be enclosed and compressed, of a porcelain stack-casing having its exterior surface at each end tapered inwardly toward a portion intermediate its length, metal collars surrounding the outside of the tapered casing-ends and having cooperative tapered surfaces; and a metal stack-compressing member exerting clamping compression against one end of the stack and mechanically connected to one of said collars; the other collar bearing against the other end of the stack and closing the corresponding end of the casing.

12. In a high potential condenser, the combination with a condenser stack to be enclosed and compressed, of a porcelain casing for said stack; a clamping screw inside the casing and exerting clamping compression on a stack-end; and a pressure plate located outside the casing, connected to said clamping screw and secured to and transmitting tension strains to the casing.

13. In a high potential condenser, the combination with a condenser stack to be enclosed and compressed, of a porcelain stack-casing having an end opening; a clamping screw exerting compression on a stack-end; a pressure plate connected to said screw and extending over the open end of the casing; and a collar engaged by said pressure plate and secured to the end of the casing.

14. In a high potential condenser, the combination with a condenser stack to be enclosed and compressed, of a porcelain stack-casing having an open end; a clamping member exerting compression on a stack-end; a collar secured to the end of the casing; a pressure plate between and engaging said clamping member and collar and transmitting clamping strains to the casing as a tension member; and a cover plate secured to said collar and closing the open end of the casing.

15. As a metal end-construction for a high potential sheet-stack electrical condenser enclosed in an insulating case, a collar having three types of annular projections, the first a downwardly extending flange for securing to the outside wall of the insulating casing, the second an inwardly extending flange for resting on the end wall of the casing, and the third an outwardly and upwardly extending set of lugs for securing to similar parts of similar condenser units.

16. In a high potential condenser, the combination with a condenser stack to be enclosed and compressed, of a porcelain stack-casing, a collar secured to the end of the casing, and a device forcing said collar in one direction and the adjacent end of the stack in the opposite direction.

17. In combination, an electrical condenser, a tubular porcelain casing therefor around the condenser and having an end opening; a metal end structure secured to said casing adjacent its end-opening and having a central hole larger than the casing-opening.

18. The combination with an electrical condenser stack, of a porcelain casing therefor having opposite end openings; a metal stack-clamping member closing one end of the casing; a metal structure at the other end of the casing, closing its opening thereat, and transmitting stack-clamping strains to the casing as a tension member and formed with laterally projecting means for securing to similar condenser units; and a device between said metal structure and the adjacent end of the stack and forcing said metal structure and stack away from one another.

19. The combination with an electrical condenser stack, and a porcelain casing therefor having an end opening, of a metal member extending adjacent the casing opening and around the outer lateral wall of the casing and secured thereto; and a stack-clamping device extending through said casing-opening between said metal member and the stack and transmitting stack-clamping strains to said metal member.

20. The combination with an electrical condenser stack, of a porcelain casing therefor having opposite end openings; and metal end structures at opposite potential ends of the stack, secured to the casing adjacent the end openings thereof and closing said openings; said casing being formed intermediate its opposite ends with two laterally and downwardly projecting skirts, the upper skirt extending laterally beyond the lower skirt; and the entire outer exposed surface of the casing, including the skirts, being glazed.

21. The combination with an electrical condenser stack, of an insulating casing therefor; a metal member outside the casing at one end thereof and receiving compression strains from an adjacent end of the stack; and a metallic structure also located outside the casing but at the other end thereof and exerting compression strains on the adjacent end of the stack; said metal member and said metallic structure cooperating in transmitting stack-clamping strains to the insulating casing as a tension member of the stack-clamping system.

22. The combination with an electrical condenser stack, of an insulating casing therefor having an open end; a metal collar outside said casing at said open end and receiving compression strains from an end of the stack; said collar being formed with a hole larger than said opening in the end of the casing, thereby exposing a portion of the end of the insulating wall of the casing; and a pressure plate extending across said open end of the casing with its ends located against said exposed portion of the end of the insulating wall of the casing.

23. The combination with an electrical condenser stack, of a porcelain casing therefor having end openings; a metal clamping terminal closing one end of the casing and receiving a compressing thrust from one end of the stack; a metal structure at the other end of the casing having a central opening in line with the adjacent casing opening but transmitting compression strains on the stack to the casing as a tension member; and a metal cover secured to said last specified metal structure and closing the opening therein and the adjacent opening in the casing.

24. The combination with an electrical condenser stack, of an insulating casing therefor; a metal member outside the casing at one end thereof; a metal member inside the casing at the other end thereof; the said metal members cooperating with one another and with the insulating casing in exerting compression strains on the opposite ends of the stack and in transmitting tension strains to the insulating casing as an element of the stack-clamping system.

25. In an electrical condenser the combination with a stack of condenser sheets, of a tubular porcelain casing extending around the sides of the stack; metal members cemented to the ends of the casing; and means, including the following, for compressing the stack sheets together inside the casing, namely, a strain-transmitting member acting between the end of the stack and an adjacent end of the porcelain casing, a pressure screw the inner end of which bears against the end of the stack and the outer end of which bears against said strain-transmitting member and diametrically opposite inwardly projecting shoulders on the metal member which is adjacent the strain-transmitting member, said metal member being shaped by the spaces between said shoulders for passing said strain transmitting member beyond them inwardly toward the stack after their metal end member has been cemented to the porcelain casing, said strain-transmitting member being turnable then to bear outwardly against said shoulders, transmitting stack-compressing strains to the porcelain casing as the tension member of the clamping means.

26. The combination with a series-sectional stack of condenser sheets compressible into intimate contact with one another, of two metal end compression bearing members respectively located at the opposite end faces of said stack; and a hollow member of insulating material extending along the sides of said stack between said end compression bearing members and mechanically connected therewith, and constituting the tension member of the system including said compression bearing members which compress the sheets of the stack together; the mechanical connection between said insulating member and one of said end compression bearing members including, first a threaded pressure applying means, second a metal member engaged by said threaded means, and third, a metal stress transmitting member engaged by said insulating tension member, whereby the operation of the threaded means varies the compression exerted on the stack by the clamping system.

27. The combination with an electrical condenser stack, of a porcelain casing therefor formed with an end opening; a metal end member adjacent the end of the casing wall around the casing opening; a stack-compressing device located inside the casing between the stack and said end member and arranged to tend to force said end member away from said end of the casing wall; said end member being formed with an integral flange extending along the outside of the casing wall near the end opening of the casing; and means including cement adjacent the material of the casing and securing together said flange and casing, thereby resisting said tendency of the end member and transmitting stack-clamping strains to the porcelain casing as a tension member.

28. The combination with an electrical condenser stack, of a porcelain casing formed with opposite end openings; integrally flanged metal members outside the casing and adjacent the ends of the casing wall around the casing openings, the flanges extending toward one another along the outside of the casing wall near the casing openings; a stack-compressing device located inside the casing between the stack and one of said end members and arranged to tend to force said flanged members away from the casing and one another; and means including cement adjacent the material of the casing and securing the flanges to the casing thereby resisting said tendency.

29. The combination with an electrical condenser stack, of a porcelain casing therefor formed with an end opening; a metal end member adjacent the end of the casing wall around the casing opening; a stack-compressing device located inside the casing between the stack and said end member and arranged to tend to force the end member away from said end of the casing wall; said end member being formed with an integral flange extending along the outside of the casing wall near the end opening of the casing; and means securing the flange to the casing.

30. The combination with a stack of electrical condenser sheets and a porcelain casing therefor having an end opening; of a metal collar held to the outer wall of the casing adjacent its end opening; a metal cover closing said opening and secured to said collar; and a stack-clamp device located between the stack and said cover, compressing the stack and transmitting stack-clamping strains to the casing by way of the collar.

31. The combination with a stack of condenser sheets, of a tubular porcelain casing therefor having a circumferential portion at one end extending radially outward; a metal collar abutting said extending portion; a strain-transmitting device pulling said collar against said extending portion; and a device compressing the sheets together inside the casing and pushing said strain-transmitting device away from the stack.

32. The combination with a stack of condenser sheets, of a tubular porcelain casing therefor; and a metal collar cemented to an end of the casing and having an opening for insertion of the stack into the casing after the cementing of the metal collar thereto.

33. The combination with a stack of condenser sheets, of a tubular porcelain casing therefor; a metal collar cemented to the outside of one end of the casing and shaped for insertion of the stack thru it into the casing; and stack-compressing means located between the stack and collar and forcing them apart, the collar being provided with bearing surfaces for said compressing means said bearing surfaces being spaced for insertion of said means thru it into the casing after the insertion of the stack therein.

34. The combination with a stack of condenser sheets, of a tubular porcelain casing therefor having at one end an outwardly extending circumferential portion, the exterior surface of said casing being glazed save at said extending portion; and a metal end member cemented to said unglazed extending portion.

35. A high potential capacitor comprising a capacitor stack, an elongated casing of insulating material surrounding said stack, means for compressing the stack and putting the casing under tension which includes a screw at one end of the stack and a metal member transmitting stress from the stack to the casing and extending around an outer end portion of said casing.

In testimony whereof we have signed our names to this specification.

JOHN A. PROCTOR.
WILLIAM M. BAILEY.